No. 733,284. Patented July 7, 1903.

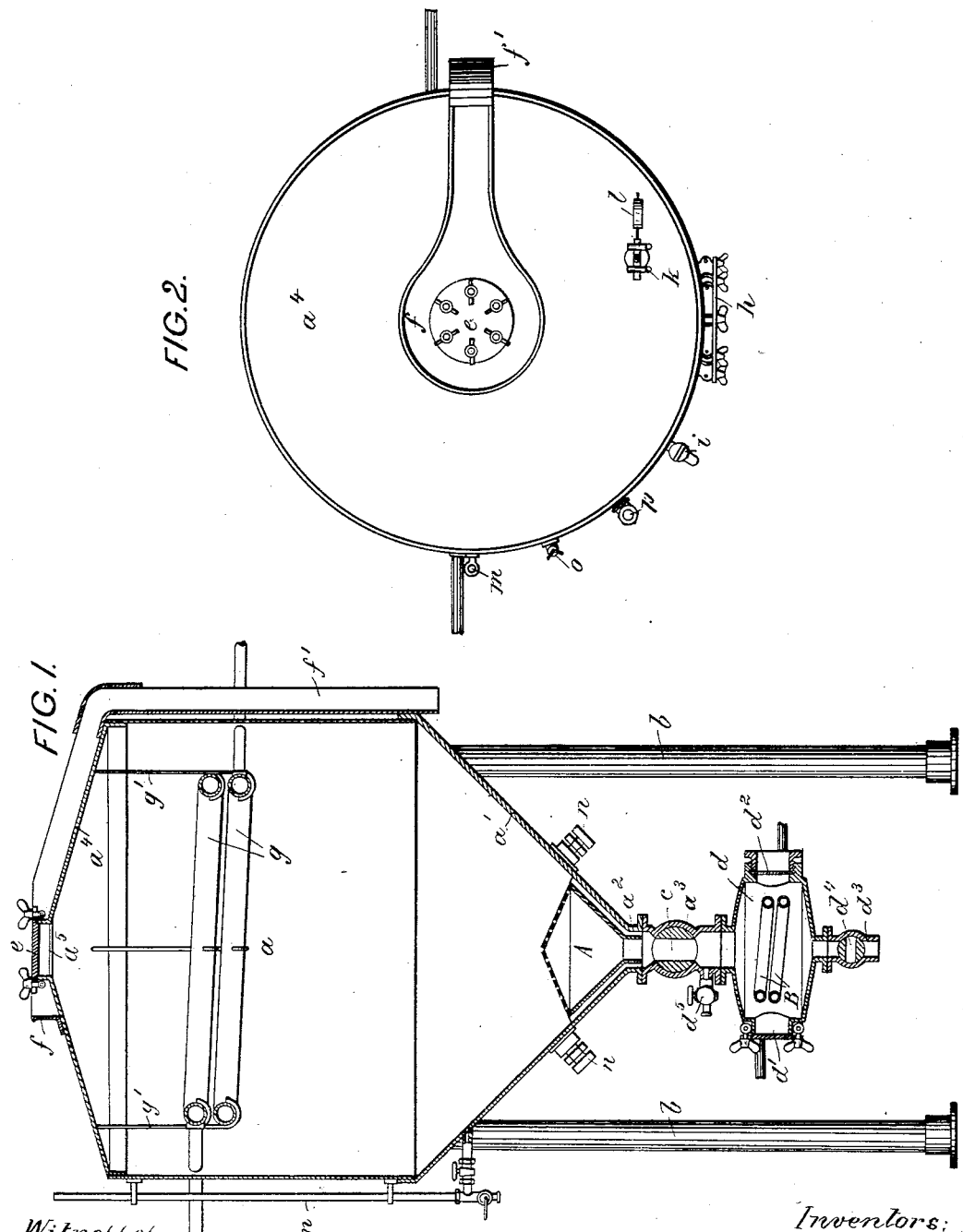

UNITED STATES PATENT OFFICE.

OTTO SELG AND CARL GUNTRUM, OF BROOKLYN, NEW YORK.

PROCESS OF CONVERTING WORT INTO BEER.

SPECIFICATION forming part of Letters Patent No. 733,284, dated July 7, 1903.

Application filed May 31, 1902. Serial No. 109,631. (No specimens.)

*To all whom it may concern:*

Be it known that we, OTTO SELG and CARL GUNTRUM, both citizens of the United States, and residents of Brooklyn, county of Kings, and State of New York, have invented certain new and useful Improvements in Processes of Converting Wort into Beer, of which the following is a specification.

This invention relates to an improved continuous process of converting wort into beer or other fermented liquid in a single apparatus and in such a manner that the beer is first thoroughly fermented and clarified before being impregnated with the carbonic-acid gas. In this way the process is accelerated and a better product is obtained.

In the accompanying drawings, Figure 1 is a vertical central section of an apparatus for carrying our process into effect, and Fig. 2 is a plan thereof with the upper cover removed.

The apparatus consists, essentially, of a cylindrical tub $a$, having a smooth inner surface and supported upon columns $b$, such substantially as shown in Patent No. 694,585, granted to us March 4, 1902. The inclined bottom $a'$ of the tub communicates at its center with a neck $a^2$, within which is seated a removable corrugated perforated funnel A. The neck is enlarged to form a valve-casing $a^3$ for a cock or valve $c$ and communicates at its lower end with a yeast chamber or pocket $d$. This pocket contains an attemperator B and is provided with a manhole $d'$, observation-glass $d^2$, and a nipple $d^3$, with draw-off cock $d^4$. Between the pocket $d$ and the cock $c$ is arranged a petcock $d^5$. The top $a^4$ of the cylinder $a$ slopes upwardly to the central bung-hole $a^5$, which may be closed tightly by a removable cover $e$. Upon the cover there is arranged around the bung-hole a gallery $f$, communicating with a drip or gutter $f'$. An attemperator $g$ is suspended in the upper part of the cylinder $a$ by means of hangers $g'$.

The apparatus is further provided with a manhole $h$, proof-cock $i$, vent $k$, pressure-gage $l$, stand-glass $m$, nipples $n$, thermometer $o$, and test-glass $p$.

In carrying out our process by means of the above-described apparatus we proceed as follows: The apparatus is mounted within a room of a brewery, the temperature of which is evenly maintained at about 41° to 43° Fahrenheit. It is charged with wort from the starting-tub or direct from the cooler through one of the nipples $n$. The yeast is introduced either together with the wort from the starting-tub or it is separately introduced through the cover $e$, or it is forced in through the cock $d^4$, (the cover $e$ being left open until the main fermentation and the after-fermentation are over.) The main fermentation will now set in and will be over in about four days, during which time filtered air may be forced into the apparatus in order to mix the yeast with the wort and accelerate the fermentation. While the main fermentation is going on the impurities will work up along the inner smooth surface of the cylinder and along the inclination of the cover, to be ejected through the bung-hole $a^5$. Arriving at the upper sloping side of the cover, they are conducted by the gallery $f$ and gutter $f'$ to a suitable dump. The carbonic-acid gas evolved during the main fermentation may be either allowed to escape together with the impurities or it may be collected as a by-product in a reservoir coupled to the vent $k$ or bung-hole $a^5$. While the impurities work out the main body of the yeast will descend along the tub $a$ and inclined bottom $a'$ to enter the chamber $d$ through the neck $a^2$ and cock $c$. This goes on during the entire duration of the main fermentation, upon the completion of which the cock $c$ is closed and the entrapped yeast is removed through cock $d^4$ without disturbing the beer. The yeast which has been withdrawn is ready for use upon a subsequent charge. After the removal of the main body of the yeast the after-fermentation is allowed to proceed by the residue of the yeast, during which the cock $d^4$ is closed and the cock $c$ is opened, while the cover $e$ remains open. The after-fermentation is allowed to proceed until all fermentable substances have been fermented in the liquid, after which the cooling liquid is turned into the attemperator $g$, so as to cause a cooling of the upper strata of the beer and a precipitation of the albuminoids. These upper strata in descending will displace the lower warmer strata and cause a thorough circulation and clarification of the entire body of the liquid, the balance of the yeast, albuminoids, &c., descending into the yeast-pocket. After the beer is thus completely fermented, cooled to a temperature near the freezing point, and clarified the sediments in the yeast-pocket $d$ are withdrawn and the pocket is now filled with kraeusen, first wort, or any other highly-concentrated fermentable liquid, together with a sufficient quantity of yeast through cock $d^4$. While this charge is being introduced the cock $c$ is closed and the petcock $d^5$ is opened to permit the escape of the air and the proper filling of the pocket. The cover $e$ and vent $k$ are next closed tight and the cock $c$ is opened. A very lively fermentation will now set in, which is controlled by the attemperator B, into which the cooling medium is admitted during the period of fermentation, and the clarified beer is impregnated with the generated carbonic-acid gas from the yeast-chamber, such gas being evenly distributed into the beer through the funnel A. Sufficient carbonic-acid gas will have been generated in three to four days, and the beer now thoroughly impregnated by the gas will be ready for the market. The cock $c$ is closed and the beer is filled into packages through nipples $n$, while the sediments in pocket $d$ are thrown away.

It will be seen that by our improved process both the main fermentation and the after-fermentation, as well as the clarification, are completed before the beer is impregnated with the gas. In this way the clarification is improved and the entire process is accelerated. Further, the beer will obtain better keeping qualities and a superior taste, because it is allowed to remain in contact with the yeast for a comparatively short period of time.

What we claim is—

The improvement in the art of manufacturing beer by successive steps in a single apparatus which consists in running the wort into a vessel, charging the wort with yeast and permitting the main fermentation to be nearly completed and the greater part of the yeast to be precipitated into a yeast-pocket, then removing the precipitated yeast and completing the fermentation with the vessel open, then clarifying the beer by cooling the upper strata thereof, then removing the precipitates from the yeast-pocket formed during the completion of the fermentation and the clarification, then charging said pocket with a concentrated fermentative and yeast, closing the vessel, and cooling the yeast-pocket during the ensuing fermentation, substantially as specified.

Signed by us at New York city, New York, this 29th day of May, 1902.

OTTO SELG.
CARL GUNTRUM.

Witnesses:
 WILLIAM SCHULZ,
 F. V. BRIESEN.